(12) United States Patent
Yang

(10) Patent No.: US 10,691,944 B2
(45) Date of Patent: Jun. 23, 2020

(54) GEO-REGISTERING AN AERIAL IMAGE BY AN OBJECT DETECTION MODEL USING MACHINE LEARNING

(71) Applicant: THE BOEING COMPANY, Chicago, IL (US)

(72) Inventor: Yan Yang, Queensland (AU)

(73) Assignee: THE BOEING COMPANY, Chicago, IL (US)

( * ) Notice: Subject to any disclaimer, the term of this patent is extended or adjusted under 35 U.S.C. 154(b) by 81 days.

(21) Appl. No.: 15/984,906

(22) Filed: May 21, 2018

(65) Prior Publication Data

US 2019/0354741 A1    Nov. 21, 2019

(51) Int. Cl.
| | |
|---|---|
| *G06K 9/00* | (2006.01) |
| *G06K 9/62* | (2006.01) |
| *G06K 9/66* | (2006.01) |
| *B64D 47/08* | (2006.01) |
| *G06N 3/08* | (2006.01) |
| *B64C 39/02* | (2006.01) |

(52) U.S. Cl.
CPC .......... *G06K 9/0063* (2013.01); *B64C 39/024* (2013.01); *B64D 47/08* (2013.01); *G06K 9/6217* (2013.01); *G06K 9/66* (2013.01); *G06N 3/08* (2013.01); *B64C 2201/104* (2013.01); *B64C 2201/127* (2013.01)

(58) Field of Classification Search
CPC . B64C 2201/127; B64C 39/024; B64D 47/08; G06K 9/66
See application file for complete search history.

(56) References Cited

U.S. PATENT DOCUMENTS

| | | | |
|---|---|---|---|
| 6,415,734 B1 | 7/2002 | LaPuzza | |
| 9,592,912 B1 | 3/2017 | Michini et al. | |
| 9,841,759 B2 * | 12/2017 | Jung | ...................... H04N 7/183 |
| 10,181,081 B2 * | 1/2019 | Schultz | ................. B64C 39/024 |
| 2015/0199556 A1 * | 7/2015 | Qian | .................... G06K 9/0063 |
| | | | 382/215 |
| 2018/0157911 A1 * | 6/2018 | Lo | ...................... G06K 9/00657 |

OTHER PUBLICATIONS

Santise et al., "Evaluation of Dem Generation Accuracy from UAS Imagery", The International Archives of Photogrammetry, Remote Sensing and Spatial Information Sciences 405, 2014, 529.

* cited by examiner

*Primary Examiner* — John J Lee
(74) *Attorney, Agent, or Firm* — Womble Bond Dickinson LLP

(57) ABSTRACT

A method of obtaining and geo-registering an aerial image of an object of interest is provided. The method includes obtaining an aerial image by a camera onboard an aircraft. The method includes accessing an object detection model trained using a machine learning algorithm and a training set of aerial images of an object of interest, and using the object detection model to detect the object of interest in the aerial image. The object detection includes a prediction of a boundary of the object of interest depicted in the aerial image based on the defined boundary of the object of interest. The method includes accessing a data store including a geographic location of the object of interest. And the method includes geo-registering the aerial image including the prediction of the boundary of the object of interest with the geographic location of the object of interest.

24 Claims, 5 Drawing Sheets

GEO-REGISTERING AN AERIAL IMAGE BY AN OBJECT DETECTION MODEL USING MACHINE LEARNING

TECHNOLOGICAL FIELD

The present disclosure relates generally to aircraft such as an unmanned aerial vehicle (UM) for inspection, survey and surveillance and, in particular, to geo-registering an aerial image of an object of interest captured by a camera onboard an aircraft such as a UAV for inspection, survey and surveillance.

BACKGROUND

In many industries, it is often desirable to extract meaningful information from images to provide an understanding of the objects depicted in the images. For example, aircraft such as unmanned aerial vehicles (UAVs) or other remotely piloted vehicles, autonomous airborne vehicles or the like, may carry cameras for capturing aerial images for inspection, survey and surveillance of objects depicted in the images. These aircraft often also geo-register aerial images with the geographic locations of objects of interest depicted in the images, many employing cameras equipped with Global Positioning System (GPS) receivers to determine geographic location. But because of the high altitude and speed of the aircraft, the geographic location provided by many of these GPS receivers is often inaccurate, some resulting in a shift in geographic location of an object by as much as 10-20 kilometers compared to a ground survey of the object. It is generally desirable to correct the error in geo-registration of aerial images for accurate inspection, survey and surveillance, but it is difficult to accomplish.

There are approaches to more accurately geo-register aerial images, including those that employ ground control markers. Ground control markers are usually black-white check pattern, painted on paper cardboard, metal sheet or pavement on the ground. The design of markers allows operators to see them with ease from the aerial capture, and input them in a geo-registration tool. But ground control markers require a lot of manual input. A person needs to place the marker at a proper location and record the GPS data. The person also needs to locate the aerial markers after the data capture. It is clearly an expensive and slow process required for each flight.

Other approaches employ image stereo matching in which an oblique image is registered to a previously generated two-dimensional, geo-referenced image. This is also sometimes called geo-registration feature matching. The drawback of this approach is that an already geo-registered reference image is required, which is not always available or easy to obtain.

Therefore it would be desirable to have a system and method that takes into account at least some of the issues discussed above, as well as other possible issues.

BRIEF SUMMARY

Example implementations of the present disclosure are directed to an improved, a high accuracy, low cost approach to geo-registering aerial images. In contrast to existing approaches, the approach of example implementations of the present disclosure does not require any special ground control markers or a manually registered "reference map" image. The approach of example implementations instead applies an object detection model using machine learning to detect visual features of an object of interest in an aerial image, and matches the depicted object of interest to its known geo-location such as from an existing ground survey. Example implementations are therefore able to produce high-quality geo-registered output using only a budget camera such as a digital single-lens reflex (DSLR) camera.

The present disclosure thus includes, without limitation, the following example implementations.

Some example implementations provide a method of obtaining and geo-registering an aerial image of an object of interest, the method comprising obtaining an aerial image by processing circuitry receiving the aerial image captured by a camera onboard an aircraft capturing the aerial image; accessing, by the processing circuitry, an object detection model trained using a machine learning algorithm and a training set of aerial images of an object of interest having a defined boundary; and by the processing circuitry, using the object detection model to detect the object of interest in the aerial image, the object detection including a prediction of a boundary of the object of interest depicted in the aerial image based on the defined boundary of the object of interest; accessing a data store including a geographic location of the object of interest; and geo-registering the aerial image including the prediction of the boundary of the object of interest with the geographic location of the object of interest.

In some example implementations of the method of any preceding example implementation, or any combination of any preceding example implementations, accessing the object detection model includes accessing the object detection model trained using a deep neural network of a deep learning algorithm.

In some example implementations of the method of any preceding example implementation, or any combination of any preceding example implementations, using the object detection model to detect the object of interest includes using the object detection model to detect the object of interest including a pixelwise dense prediction of pixels of the object of interest depicted in the aerial image.

In some example implementations of the method of any preceding example implementation, or any combination of any preceding example implementations, the method further comprises obtaining the geographic location of the object of interest from a ground survey and independent of the training set of aerial images; and creating the data store with the geographic location so obtained.

In some example implementations of the method of any preceding example implementation, or any combination of any preceding example implementations, geo-registering the aerial image includes geo-registering the aerial image through means of an embedded metadata tag that gives the geographic location of the object of interest.

In some example implementations of the method of any preceding example implementation, or any combination of any preceding example implementations, the camera or aircraft is equipped with a satellite-based navigation receiver configured to determine a geographic location of the object of interest, wherein obtaining the aerial image includes obtaining the aerial image with an embedded metadata tag that gives the geographic location of the object of interest determined by the satellite-based navigation receiver, and wherein geo-registering the aerial image includes replacing the embedded metadata tag that gives the geographic location of the object of interest determined by the satellite-based navigation receiver, with an embedded metadata tag that gives the geographic location of the object of interest from the data store.

In some example implementations of the method of any preceding example implementation, or any combination of any preceding example implementations, the training set on which the object detection model is trained further includes aerial images of a second object of interest having a second defined boundary, wherein using the object detection model includes using the object detection model to further detect the second object of interest in the aerial image, the object detection further including a pixelwise dense prediction of pixels of the aerial image in which the second object of interest is depicted based on the second defined boundary of the second object of interest, wherein accessing the data store includes accessing the data store further including a second geographic location of the second object of interest, and wherein geo-registering the aerial image includes geo-registering the aerial image further with the second geographic location of geographic location of the second object of interest.

In some example implementations of the method of any preceding example implementation, or any combination of any preceding example implementations, the method further comprises performing an affine transformation on the aerial image after using the object detection model to detect the object of interest including the prediction of the boundary of the object of interest in the aerial image; and thereafter, adding the aerial image with the prediction of the boundary of the object of interest to the training set of aerial images.

Some example implementations provide an apparatus for obtaining and geo-registering an aerial image of an object of interest. The apparatus comprises a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for obtaining and geo-registering an aerial image of an object of interest. The computer-readable storage medium is non-transitory and having computer-readable program code stored therein that in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
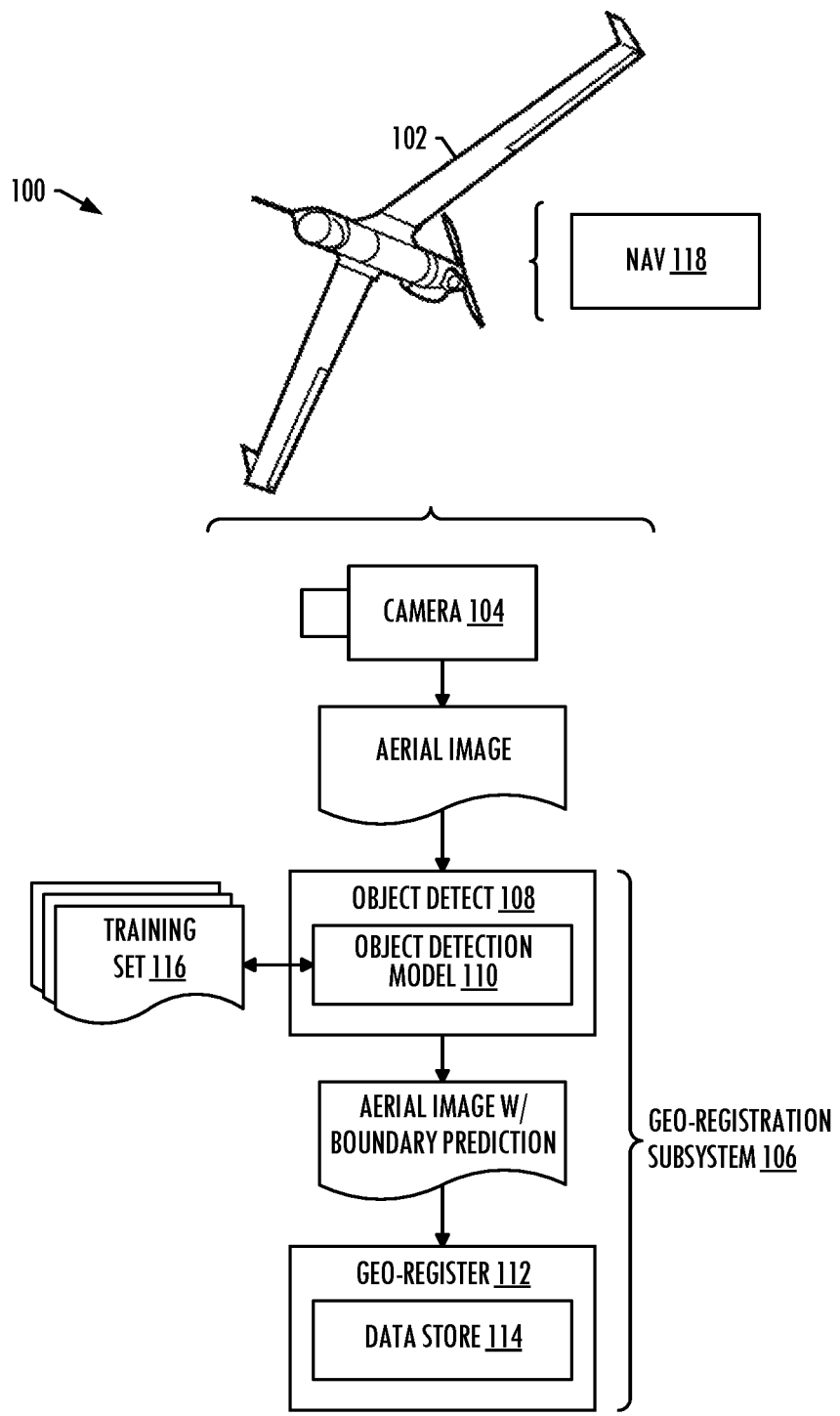
FIG. 1 illustrates a system for obtaining and geo-registering an aerial image of an object of interest, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to aircraft for inspection, survey and surveillance and, in particular, to geo-registering an aerial image of an object of interest captured by a camera onboard an aircraft. Example implementations will be primarily described in the context of aerial images captured by a camera onboard an unmanned aerial vehicle (UAV) for inspection, survey and surveillance. It should be understood, however, that example implementations may be equally applicable to aerial images captured by cameras onboard other types of aircraft or onboard spacecraft. Examples of suitable objects of interest include natural landmarks, man-made landmarks, buildings, water wells, roads, bridges, vehicles and the like.

As introduced above, example implementations of the present disclosure provide a high-accuracy, low cost geo-registration system for aerial inspection, survey and surveillance. The system of example implementations uses object detection to improve geo-registration accuracy. The system is able to achieve robust, high-accuracy registration, without and thus less expensively than approaches that require laying ground control markers for every flight. Example implementations make use of a training set of aerial images of an object of interest, and a data store of accurate geographic locations of objects of interest that may be created from ground surveys of the objects that may involve a single surveyor and a handheld satellite-based navigation (e.g., GPS) receiver.

Example implementations of the present disclosure are also able to detect any of a number of different types of objects of interest. Any object or class of object able to be detected through an object detection may be detected according to example implementations. That is, example implementations may detect instances of any of a number of semantic objects of any of a number of different classes in aerial images (still or video).

FIG. 1 illustrates a system 100 for obtaining and geo-registering an aerial image of an object of interest, according to example implementations of the present disclosure. The system may include any of a number of different subsystems (each an individual system) for performing one or more functions or operations. As shown, in some examples, the system includes an aircraft 102 (e.g., a UAV) with an onboard camera 104 configured to capture aerial images such as video or still images. Any of a number of different types of cameras may be used to capture the aerial images, including budget cameras such as digital single-lens reflex (DSLR) cameras. The system also includes a geo-registration subsystem 106 with an object detect module 108 configured to use an object detection model 110, and a geo-registration module 112 configured to access a data store 114.

The camera 104 and geo-registration subsystem 106 may be co-located or directly coupled to one another, or in some examples, the camera and geo-registration subsystem may communicate with one another across one or more computer networks. In some examples, the camera and geo-registration subsystem are both onboard the aircraft 102. In other examples, the camera is onboard the aircraft, and the geo-registration subsystem is off-board. Further, although shown as part of the geo-registration subsystem, it should be understood that any one or more of the object detect module 108, object detection model 110, geo-registration module 112 or data store 114 may function or operate as a separate system without regard to any of the other subsystems. It should also be understood that the system 100 may include one or more additional or alternative subsystems than those shown in FIG. 1.

In some example implementations, an aerial image is obtained by the camera 104 onboard the aircraft 102 capturing the aerial image. The geo-registration subsystem 106 may likewise obtain the aerial image, the geo-registration subsystem being configured to receive the aerial image captured by the camera. In some examples, the geo-registration system may be configured to request or instruct the camera to capture the aerial image or send the aerial image already captured to the geo-registration, synchronously or asynchronously. Or in other examples, the camera may be configured to automatically send the aerial image to the geo-registration system when captured. The object detect module 108 is configured to access the object detection model 110 trained using a machine learning algorithm and a training set 116 of aerial images of an object of interest having a defined boundary. Examples of suitable machine learning algorithms include deep learning algorithms with deep neural networks such as a fully convolutional neural network (CNN).

The object detect module 108 is configured to use the object detection model 110 to detect the object of interest in the aerial image. In this regard, the object detection model may be used to perform an object detection to detect the object of interest. This object detection includes a prediction of a boundary of the object of interest depicted in the aerial image based on the defined boundary of the object of interest. In some examples, the object detect module is configured to detect the object of interest including a pixelwise dense prediction of pixels of the object of interest depicted in the aerial image.

A suitable object detection model 110 may take aerial images from flights of the aircraft 102, and detect an object of interest and its boundary with 99.7% accuracy (on a validation set). The boundary prediction provides geometry information of the object of interest that can be further manipulated to fit a known geometry of the object. In some examples, then, the object detect module 108 is further configured to perform an affine transformation (e.g., shift, scale and/or rotation) on the aerial image after the object detection model 110 is used to detect the object of interest including the prediction of the boundary of the object of interest in the aerial image. The object detect module may then be configured to add the aerial image with the prediction of the boundary of the object of interest to the training set 116 of aerial images for further training of the object detection model.

The geo-registration module 112 is configured to access the data store 114 including a geographic location of the object of interest. In some examples, the geo-registration module is configured to obtain the geographic location of the object of interest from a ground survey and independent of the training set 116 of aerial images, and create the data store 114 with the geographic location so obtained. A ground survey in this context refers to a survey made by measurement on the surface of the earth as distinguished from aerial survey. Regardless of whether the geo-registration module creates the data store, the geo-registration module is configured to geo-register the aerial image including the prediction of the boundary of the object of interest with the geographic location of the object of interest. In some examples, the geo-registration module is configured to geo-register the aerial image through means of an embedded metadata tag (of the aerial image) that gives the geographic location of the object of interest.

In some examples, the camera 104 or aircraft 102 is equipped with a satellite-based navigation receiver 118 such as a Global Positioning System (GPS) receiver configured to determine a geographic location of the object of interest. In at least some of these examples, the geo-registration subsystem 106 is configured to obtain the aerial image with an embedded metadata tag that gives the geographic location of the object of interest determined by the satellite-based navigation receiver. The geo-registration module 112, then, may be configured to replace the embedded metadata tag that gives the geographic location of the object of interest determined by the satellite-based navigation receiver, with an embedded metadata tag that gives the geographic location of the object of interest from the data store 114.

Figure 2A:
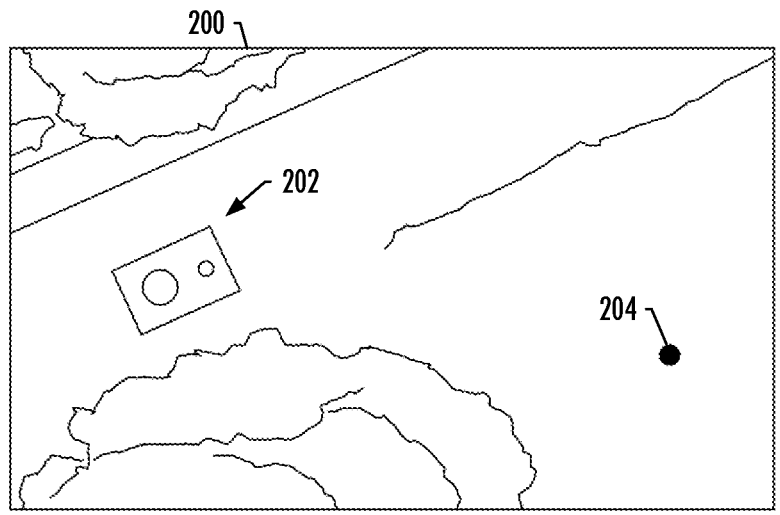
FIGS. 2A, 2B, 3A and 3B illustrate aerial images of objects of interest according to example implementations.
Figure 2B:
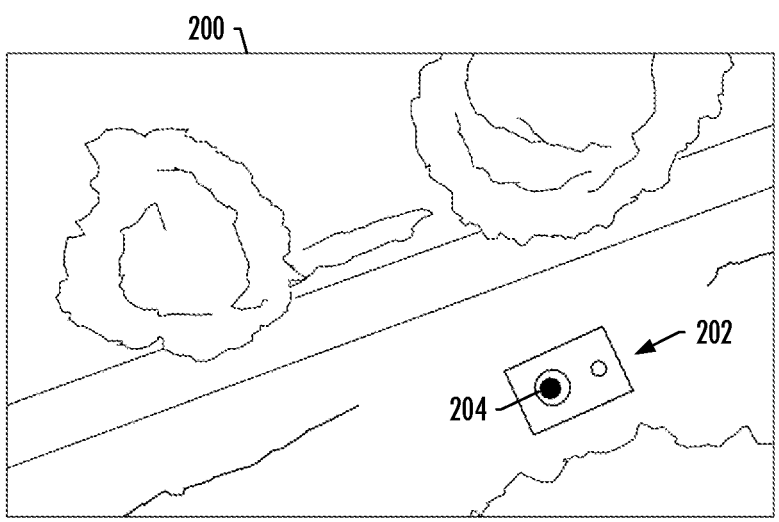

FIG. 2A illustrates an aerial image 200 of an object of interest 202 before applying example implementations of the present disclosure. The aerial image in FIG. 2A indicates the geographic location of the object of interest determined by a satellite-based navigation receiver 118, and includes an indicator 204 of the geographic location of the object of interest from the data store 114, illustrating an evident shift in geographic location of the object. FIG. 2B then illustrates the aerial image after applying example implementations of the present disclosure. In FIG. 2B, the aerial image is shifted to shift the object of interest to its geographic location from the data store.

It will be appreciated that example implementations of the present disclosure may be used to detect and geo-register the aerial image to the geographic locations of multiple objects of interest that are depicted in the aerial image. In some examples, then, the training set 116 on which the object detection model 110 is trained further includes aerial images of a second object of interest having a second defined boundary. The object detect module 108 may be configured to use the object detection model to further detect the second object of interest in the aerial image, including a pixelwise dense prediction of pixels of the aerial image in which the second object of interest is depicted based on the second defined boundary of the second object of interest. The geo-registration module 112 may be configured to access the data store 114 further including a second geographic location of the second object of interest, and geo-register the aerial image further with the second geographic location of the second object of interest.

Figure 3A:
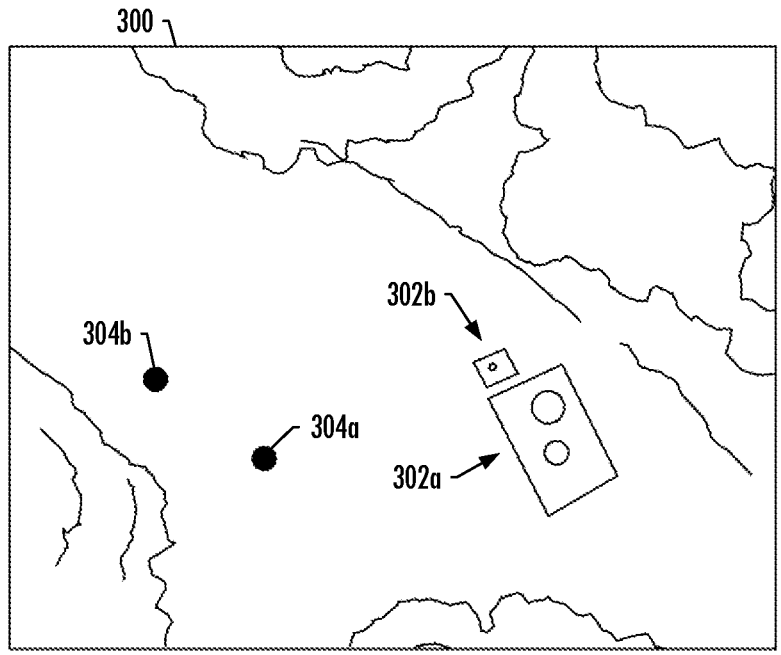
Figure 3B:
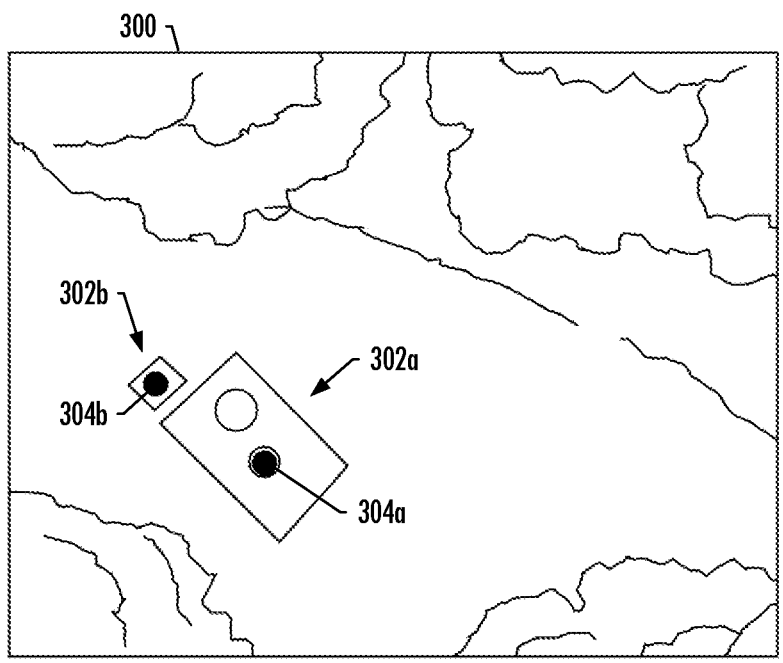

FIG. 3A illustrates an aerial image 300 of first and second objects of interest 302a, 302b before applying example implementation of the present disclosure. The aerial image in FIG. 3A indicates the geographic locations of the objects of interest determined by a satellite-based navigation receiver 118, and includes indicators 304a, 304b of the geographic locations of the objects of interest from the data store 114, illustrating an evident shift in geographic locations of the objects. FIG. 3B then illustrates the aerial image after applying example implementation of the present disclosure. The aerial image in FIG. 3B is shifted to shift the objects of interest to their geographic locations from the data store.

Figure 4:
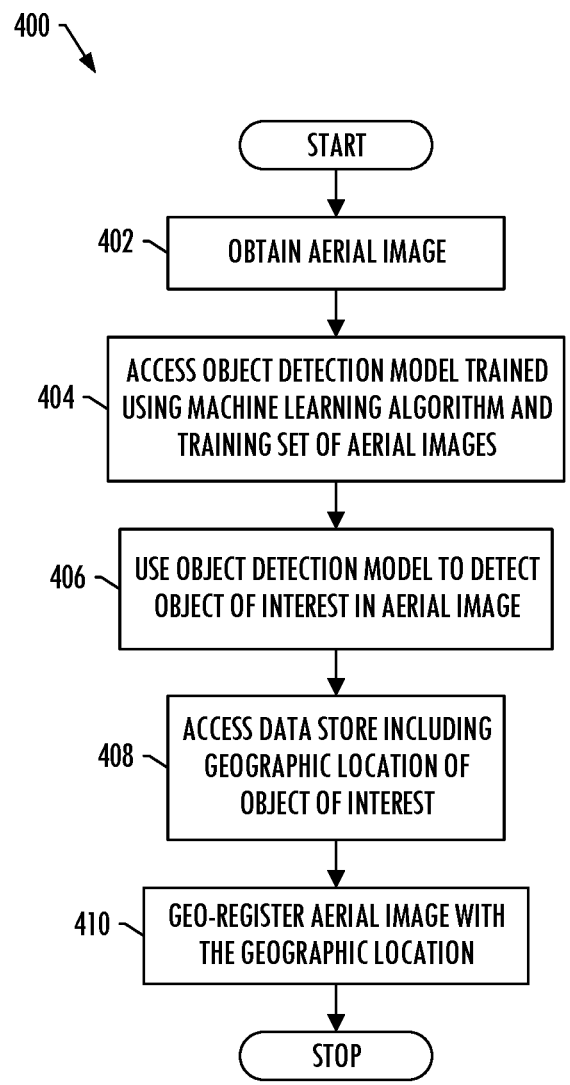
FIG. 4 is a flowchart illustrating various steps in a method of obtaining and geo-registering an aerial image of an object of interest, according to various example implementations.

FIG. 4 is a flowchart illustrating various steps in a method 400 of obtaining and geo-registering an aerial image of an object of interest, according to example implementations of the present disclosure. As shown at block 402, the method includes obtaining an aerial image by processing circuitry receiving the aerial image captured by a camera onboard an aircraft capturing the aerial image. See, for example, FIG. 5, processing circuitry 502. The method includes accessing, by the processing circuitry, an object detection model trained using a machine learning algorithm and a training set of aerial images of an object of interest having a defined boundary, as shown at block 404. The method includes, by the processing circuitry, using the object detection model to detect the object of interest in the aerial image, as shown at block 406. Here, the object detection includes a prediction of a boundary of the object of interest depicted in the aerial image based on the defined boundary of the object of interest. As shown at block 408, the method includes, by the processing circuitry, accessing a data store including a geographic location of the object of interest. And as shown at block 410, the method includes, by the processing circuitry, geo-registering the aerial image including the prediction of the boundary of the object of interest with the geographic location of the object of interest.

According to example implementations of the present disclosure, the geo-registration subsystem 106 and its elements including the object detect module 108, object detection model 110, geo-registration module 112 and data store 114 may be implemented by various means. Means for implementing the geo-registration subsystem and its elements may include hardware, alone or under direction of one or more computer programs from a computer-readable storage medium. In some examples, one or more apparatuses may be configured to function as or otherwise implement the geo-registration subsystem and its elements shown and described herein. In examples involving more than one apparatus, the respective apparatuses may be connected to or otherwise in communication with one another in a number of different manners, such as directly or indirectly via a wired or wireless network or the like.

Figure 5:
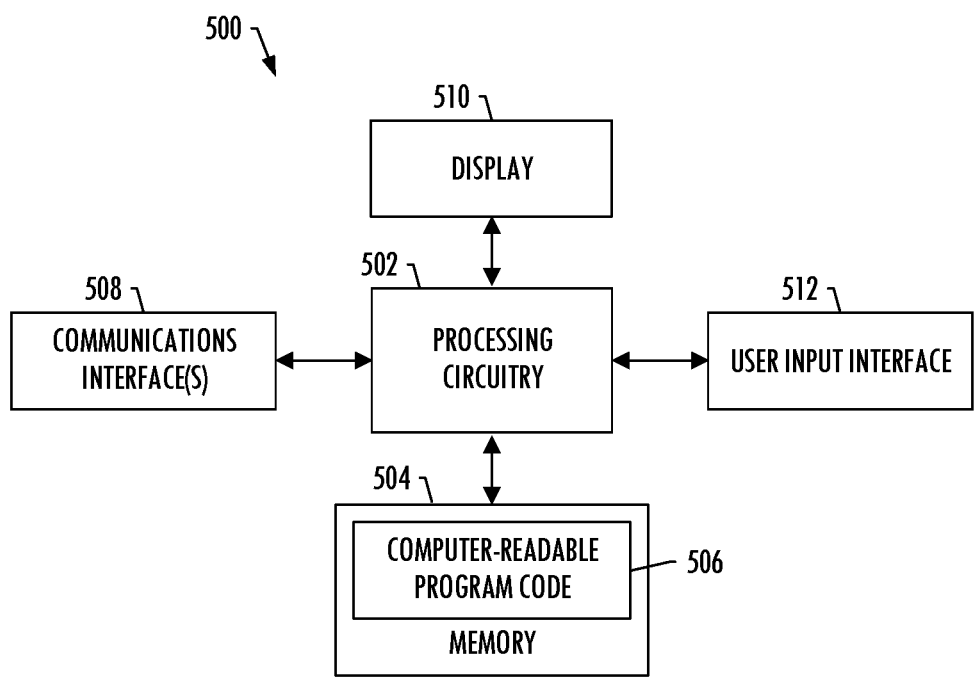
FIG. 5 illustrates an apparatus according to some example implementations.

FIG. 5 illustrates an apparatus 500 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 502 (e.g., processor unit) connected to a memory 504 (e.g., storage device).

The processing circuitry 502 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 504 (of the same or another apparatus).

The processing circuitry 502 may be a number of processors, a multi-core processor or some other type of processor, depending on the particular implementation. The processing circuitry may include a graphic processing unit (GPU), a central processing unit (CPU), or a combination of GPU and CPU. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processing circuitry 502 may also be connected to one or more interfaces for displaying, transmitting and/or receiving information. The interfaces may include a communications interface 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 500 may include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for obtaining and geo-registering an aerial image of an object of interest, the apparatus comprising:
a memory configured to store computer-readable program code; and
processing circuitry configured to access the memory, and execute the computer-readable program code to cause the apparatus to at least:
obtain an aerial image by the processing circuitry being configured to receive the aerial image captured by a camera onboard an aircraft capturing the aerial image;
access an object detection model trained using a machine learning algorithm and a training set of aerial images of the object of interest having a defined boundary;
use the object detection model to detect the object of interest in the aerial image, the object detection including a prediction of a boundary of the object of interest depicted in the aerial image based on the defined boundary of the object of interest;
access a data store including a geographic location of the object of interest; and
geo-register the aerial image including the prediction of the boundary of the object of interest with the geographic location of the object of interest.

2. The apparatus of claim 1, wherein the apparatus being caused to access the object detection model includes being caused to access the object detection model trained using a deep neural network of a deep learning algorithm.

3. The apparatus of claim 1, wherein the apparatus being caused to use the object detection model to detect the object of interest includes being caused to use the object detection model to detect the object of interest including a pixelwise dense prediction of pixels of the object of interest depicted in the aerial image.

4. The apparatus of claim 1, wherein the processing circuitry is configured to execute the computer-readable program code to cause the apparatus to further at least:
obtain the geographic location of the object of interest from a ground survey and independent of the training set of aerial images; and
create the data store with the geographic location so obtained.

5. The apparatus of claim 1, wherein the apparatus being caused to geo-register the aerial image includes being caused to geo-register the aerial image through means of an embedded metadata tag that gives the geographic location of the object of interest.

6. The apparatus of claim 1, wherein the camera or aircraft is equipped with a satellite-based navigation receiver configured to determine a geographic location of the object of interest,
wherein the apparatus being caused to obtain the aerial image includes being caused to obtain the aerial image with an embedded metadata tag that gives the geographic location of the object of interest determined by the satellite-based navigation receiver, and
wherein the apparatus being caused to geo-register the aerial image includes being caused to replace the embedded metadata tag that gives the geographic location of the object of interest determined by the satellite-based navigation receiver, with an embedded metadata tag that gives the geographic location of the object of interest from the data store.

7. The apparatus of claim 1, wherein the training set on which the object detection model is trained further includes aerial images of a second object of interest having a second defined boundary,
wherein the apparatus being caused to use the object detection model includes being caused to use the object detection model to further detect the second object of interest in the aerial image, the object detection further including a pixelwise dense prediction of pixels of the aerial image in which the second object of interest is depicted based on the second defined boundary of the second object of interest,
wherein the apparatus being caused to access the data store includes being caused to access the data store further including a second geographic location of the second object of interest, and
wherein the apparatus being caused to geo-register the aerial image includes being caused to geo-register the aerial image further with the second geographic location of the second object of interest.

8. The apparatus of claim 1, wherein the processing circuitry is configured to execute the computer-readable program code to cause the apparatus to further at least:
perform an affine transformation on the aerial image after the object detection model is used to detect the object of interest including the prediction of the boundary of the object of interest in the aerial image; and thereafter,
add the aerial image with the prediction of the boundary of the object of interest to the training set of aerial images.

9. A method of obtaining and geo-registering an aerial image of an object of interest, the method comprising:
obtaining an aerial image by processing circuitry receiving the aerial image captured by a camera onboard an aircraft capturing the aerial image;
accessing, by the processing circuitry, an object detection model trained using a machine learning algorithm and a training set of aerial images of the object of interest having a defined boundary; and by the processing circuitry,
using the object detection model to detect the object of interest in the aerial image, the object detection including a prediction of a boundary of the object of interest depicted in the aerial image based on the defined boundary of the object of interest;
accessing a data store including a geographic location of the object of interest; and
geo-registering the aerial image including the prediction of the boundary of the object of interest with the geographic location of the object of interest.

10. The method of claim 9, wherein accessing the object detection model includes accessing the object detection model trained using a deep neural network of a deep learning algorithm.

11. The method of claim 9, wherein using the object detection model to detect the object of interest includes using the object detection model to detect the object of interest including a pixelwise dense prediction of pixels of the object of interest depicted in the aerial image.

12. The method of claim 9 further comprising:
obtaining the geographic location of the object of interest from a ground survey and independent of the training set of aerial images; and
creating the data store with the geographic location so obtained.

13. The method of claim 9, wherein geo-registering the aerial image includes geo-registering the aerial image through means of an embedded metadata tag that gives the geographic location of the object of interest.

14. The method of claim 9, wherein the camera or aircraft is equipped with a satellite-based navigation receiver configured to determine a geographic location of the object of interest,
wherein obtaining the aerial image includes obtaining the aerial image with an embedded metadata tag that gives the geographic location of the object of interest determined by the satellite-based navigation receiver, and
wherein geo-registering the aerial image includes replacing the embedded metadata tag that gives the geographic location of the object of interest determined by the satellite-based navigation receiver, with an embedded metadata tag that gives the geographic location of the object of interest from the data store.

15. The method of claim 9, wherein the training set on which the object detection model is trained further includes aerial images of a second object of interest having a second defined boundary,
wherein using the object detection model includes using the object detection model to further detect the second object of interest in the aerial image, the object detection further including a pixelwise dense prediction of pixels of the aerial image in which the second object of interest is depicted based on the second defined boundary of the second object of interest,
wherein accessing the data store includes accessing the data store further including a second geographic location of the second object of interest, and wherein geo-registering the aerial image includes geo-registering the aerial image further with the second geographic location of the second object of interest.

16. The method of claim 9 further comprising:
performing an affine transformation on the aerial image after using the object detection model to detect the object of interest including the prediction of the boundary of the object of interest in the aerial image; and thereafter,
adding the aerial image with the prediction of the boundary of the object of interest to the training set of aerial images.

17. A non-transitory computer-readable storage medium for obtaining and geo-registering an aerial image of an object of interest, and having computer-readable program code stored therein that in response to execution by processing circuitry, causes an apparatus to at least:
obtain an aerial image by the processing circuitry being configured to receive the aerial image captured by a camera onboard an aircraft capturing the aerial image;
access an object detection model trained using a machine learning algorithm and a training set of aerial images of the object of interest having a defined boundary;
use the object detection model to detect the object of interest in the aerial image, the object detection including a prediction of a boundary of the object of interest depicted in the aerial image based on the defined boundary of the object of interest;
access a data store including a geographic location of the object of interest; and
geo-register the aerial image including the prediction of the boundary of the object of interest with the geographic location of the object of interest.

18. The computer-readable storage medium of claim 17, wherein the apparatus being caused to access the object detection model includes being caused to access the object detection model trained using a deep neural network of a deep learning algorithm.

19. The computer-readable storage medium of claim 17, wherein the apparatus being caused to use the object detection model to detect the object of interest includes being caused to use the object detection model to detect the object of interest including a pixelwise dense prediction of pixels of the object of interest depicted in the aerial image.

20. The computer-readable storage medium of claim 17 having further computer-readable program code stored therein that in response to execution by the processing circuitry causes the apparatus to further at least:
obtain the geographic location of the object of interest from a ground survey and independent of the training set of aerial images; and
create the data store with the geographic location so obtained.

21. The computer-readable storage medium of claim 17, wherein the apparatus being caused to geo-register the aerial image includes being caused to geo-register the aerial image through means of an embedded metadata tag that gives the geographic location of the object of interest.

22. The computer-readable storage medium of claim 17, wherein the camera or aircraft is equipped with a satellite-based navigation receiver configured to determine a geographic location of the object of interest,
wherein the apparatus being caused to obtain the aerial image includes being caused to obtain the aerial image with an embedded metadata tag that gives the geographic location of the object of interest determined by the satellite-based navigation receiver, and
wherein the apparatus being caused to geo-register the aerial image includes being caused to replace the embedded metadata tag that gives the geographic location of the object of interest determined by the satellite-based navigation receiver, with an embedded metadata tag that gives the geographic location of the object of interest from the data store.

23. The computer-readable storage medium of claim 17, wherein the training set on which the object detection model is trained further includes aerial images of a second object of interest having a second defined boundary,
wherein the apparatus being caused to use the object detection model includes being caused to use the object detection model to further detect the second object of interest in the aerial image, the object detection further including a pixelwise dense prediction of pixels of the aerial image in which the second object of interest is depicted based on the second defined boundary of the second object of interest,
wherein the apparatus being caused to access the data store includes being caused to access the data store further including a second geographic location of the second object of interest, and
wherein the apparatus being caused to geo-register the aerial image includes being caused to geo-register the aerial image further with the second geographic location of the second object of interest.

24. The computer-readable storage medium of claim 17 having further computer-readable program code stored therein that in response to execution by the processing circuitry causes the apparatus to further at least:
perform an affine transformation on the aerial image after the object detection model is used to detect the object of interest including the prediction of the boundary of the object of interest in the aerial image; and thereafter,
add the aerial image with the prediction of the boundary of the object of interest to the training set of aerial images.

* * * * *